(12) United States Patent
Perriello

(10) Patent No.: US 7,182,871 B2
(45) Date of Patent: *Feb. 27, 2007

(54) WASTEWATER TREATMENT WITH ALKANES

(75) Inventor: Felix Anthony Perriello, Norwood, MA (US)

(73) Assignee: Global BioSciences, Inc., North Attleborough, MA (US)

( * ) Notice: Subject to any disclaimer, the term of this patent is extended or adjusted under 35 U.S.C. 154(b) by 39 days.

This patent is subject to a terminal disclaimer.

(21) Appl. No.: 10/308,607

(22) Filed: Dec. 2, 2002

(65) Prior Publication Data

US 2003/0136735 A1    Jul. 24, 2003

Related U.S. Application Data

(63) Continuation-in-part of application No. 09/924,791, filed on Aug. 8, 2001, now Pat. No. 6,669,846, which is a continuation-in-part of application No. 09/729,039, filed on Dec. 4, 2000, now Pat. No. 6,488,850, which is a continuation-in-part of application No. 09/275,320, filed on Mar. 24, 1999, now Pat. No. 6,245,235, which is a continuation-in-part of application No. 08/767,750, filed on Dec. 17, 1996, now Pat. No. 5,888,396.

(60) Provisional application No. 60/291,165, filed on May 15, 2001, provisional application No. 60/234,482, filed on Sep. 22, 2000.

(51) Int. Cl.
*C02F 3/00* (2006.01)

(52) U.S. Cl. ...................... 210/603; 210/610; 210/150; 210/220

(58) Field of Classification Search ................ 210/220, 210/610, 150, 603
See application file for complete search history.

(56) References Cited

U.S. PATENT DOCUMENTS 2,234,637 A * 3/1941 Taggart, Jr. .................... 435/9

(Continued)

FOREIGN PATENT DOCUMENTS

| DE | 4142063 | 12/1991 |
| EP | 0098138 | 1/1984 |
| JP | 53-96380 A * | 8/1978 |

OTHER PUBLICATIONS

Wilson et al., "Biotransformation of Trichloroethylene in Soil," *Applied and Environmental Microbiology*, Jan. 1985; p. 242-243, vol. 49, No. 1.

(Continued)

*Primary Examiner*—Chester T. Barry
(74) *Attorney, Agent, or Firm*—Alan G. Towner, Esq.; Pietragallo, Bosick & Gordon LLP

(57) ABSTRACT

An apparatus and method are provided for treating wastewater with alkanes such as butane. An oxygen-containing gas may also be introduced into the wastewater. Butane, because of its relatively high solubility, rapidly dissolves in the wastewater, thereby significantly increasing the heterogeneous microbial community and heterotrophic microbial population. This enhanced microbial population may rapidly absorb and mineralize materials in the wastestream. After an initial growth phase, the organic matter available in the wastewater effluent may be rapidly decreased, thereby reducing the amount of BOD, TDS, sludge and other pollutants. In addition, the use of butane reduces noxious odors associated with municipal wastewater sludges and other types of wastewater.

15 Claims, 10 Drawing Sheets

U.S. PATENT DOCUMENTS

| | | | |
|---|---|---|---|
| 3,242,071 A | | 3/1966 | Walker |
| 3,616,216 A | | 10/1971 | Wegner |
| 3,687,646 A | * | 8/1972 | Brent .......................... 48/209 |
| 3,829,377 A | * | 8/1974 | Hashimoato |
| 3,846,290 A | | 11/1974 | Raymond |
| 3,969,446 A | | 7/1976 | Franklin, Jr. |
| 4,033,763 A | | 7/1977 | Markels, Jr. |
| 4,111,808 A | | 9/1978 | Fair |
| 4,285,812 A | | 8/1981 | Stoltz |
| 4,328,175 A | | 5/1982 | Roeckel et al. |
| 4,454,077 A | | 6/1984 | Litz |
| 4,508,824 A | | 4/1985 | Olsen |
| 4,510,057 A | * | 4/1985 | Rowe et al. ................. 210/612 |
| 4,521,515 A | | 6/1985 | Hata |
| 4,522,723 A | | 6/1985 | Kauffman et al. |
| 4,645,603 A | | 2/1987 | Frankl |
| 4,695,378 A | | 9/1987 | Ackman et al. |
| RE32,562 E | | 12/1987 | Litz |
| 4,713,343 A | | 12/1987 | Wilson, Jr. et al. |
| 4,737,289 A | | 4/1988 | Castaldi et al. |
| 4,789,478 A | | 12/1988 | Revis et al. |
| 4,790,940 A | | 12/1988 | Castaldi et al. |
| 4,906,454 A | | 3/1990 | Melanson, Jr. et al. |
| 4,956,080 A | | 9/1990 | Josefik |
| 5,006,250 A | | 4/1991 | Roberts et al. |
| 5,032,512 A | | 7/1991 | Witholt et al. |
| 5,037,551 A | * | 8/1991 | Barkley et al. ............. 210/603 |
| 5,038,715 A | | 8/1991 | Fahs, II |
| 5,057,221 A | | 10/1991 | Bryant et al. |
| 5,061,405 A | | 10/1991 | Cheng |
| 5,062,956 A | | 11/1991 | Lupton et al. |
| 5,073,309 A | | 12/1991 | Bousquet et al. |
| 5,082,652 A | | 1/1992 | Mayfield et al. |
| 5,085,809 A | | 2/1992 | Stirling |
| 5,135,859 A | | 8/1992 | Witholt et al. |
| 5,169,532 A | | 12/1992 | Whitlock |
| 5,173,428 A | | 12/1992 | Witholt et al. |
| 5,277,815 A | | 1/1994 | Beeman |
| 5,302,286 A | | 4/1994 | Semprini et al. |
| 5,314,076 A | | 5/1994 | La Place et al. |
| 5,316,940 A | | 5/1994 | Georgiou et al. |
| 5,326,703 A | | 7/1994 | Hazen et al. |
| 5,337,820 A | | 8/1994 | Jenneman et al. |
| 5,342,769 A | | 8/1994 | Hunter et al. |
| 5,354,688 A | | 10/1994 | Francis et al. |
| 5,371,002 A | | 12/1994 | Dennis et al. |
| 5,384,048 A | | 1/1995 | Hazen et al. |
| 5,397,473 A | | 3/1995 | Jewell |
| 5,397,481 A | | 3/1995 | Mattus |
| 5,441,887 A | | 8/1995 | Hanson et al. |
| 5,468,090 A | | 11/1995 | Brombach |
| 5,494,576 A | | 2/1996 | Hoppe et al. |
| 5,512,479 A | | 4/1996 | Steffan |
| 5,529,693 A | | 6/1996 | Yano et al. |
| 5,651,890 A | * | 7/1997 | Trost .......................... 210/603 |
| 5,660,730 A | | 8/1997 | Lucchese et al. |
| 5,678,632 A | | 10/1997 | Moses et al. |
| 5,733,067 A | | 3/1998 | Hunt et al. |
| 5,789,236 A | | 8/1998 | Jenneman |
| 5,814,514 A | | 9/1998 | Steffan et al. |
| 5,820,759 A | | 10/1998 | Stewart et al. |
| 5,833,855 A | | 11/1998 | Saunders |
| 5,888,396 A | * | 3/1999 | Perriello .................... 210/611 |
| 5,916,491 A | | 6/1999 | Hills |
| 5,925,290 A | | 7/1999 | Hills |
| 5,945,026 A | | 8/1999 | Thames |
| 6,051,130 A | | 4/2000 | Perriello |
| 6,110,372 A | | 8/2000 | Perriello |
| 6,156,203 A | | 12/2000 | Perriello |
| 6,183,644 B1 | | 2/2001 | Adams et al. |
| 6,210,579 B1 | | 4/2001 | Perriello |
| 6,217,766 B1 | | 4/2001 | Stetter et al. |
| 6,244,346 B1 | | 6/2001 | Perriello |
| 6,245,235 B1 | | 6/2001 | Perriello |
| 6,303,366 B1 | | 10/2001 | Steffan et al. |
| 6,306,302 B1 | | 10/2001 | Maree et al. |
| 6,322,700 B1 | | 11/2001 | Suthersan |
| 6,361,694 B1 | | 3/2002 | Trost |
| 6,383,388 B1 | | 5/2002 | Krauter et al. |
| 6,391,209 B1 | | 5/2002 | Belongia et al. |
| 6,488,850 B2 | | 12/2002 | Perriello |
| 6,669,846 B2 * | | 12/2003 | Perriello |

OTHER PUBLICATIONS

Folsom et al. "Phenol and Trichloroethylene Degradation by *Pseudomonas cepacia* G4: Kinetics and Interactions Between Substrates," *Applied and Environmental Microbiology*, May 1990; p. 1279-1285, vol. 56, No. 5.

Broholm et al., "Toxicity of 1,1,1-Trichloroethane and Trichloroethene on a Mixed Culture of Methane-Oxidizing Bacteria", *Applied and Environmental Microbiology*, Aug. 1990, p. 2488-2493, vol. 56, No. 8.

Henry et al., "Influence of Endogenous and Exogenous Electron Donors and Trichloroethylene Oxidation Toxicity on Trichloroethylene Oxidation by Methanotrophic Cultures from a Groundwater Aquifer," *Applied and Environmental Microbiology*, Jan. 1991; p. 236-244, vol. 57, No. 1.

Oldenhuis et al., "Kinetics of Chlorinated Hydrocarbon Degradation by *Methylosinus trichosporium* OB3b and Toxicity of Trichloroethylene," *Applied and Environmental Microbiology*, Jan. 1991; p. 7-14, vol. 57, No. 1.

Alvarez-Cohen et al., "Product Toxicity and Cometabolic Competitive Inhibition Modeling of Chloroform and Trichloroethylene Transformation by Methanotrophic Resting Cells," *Applied Environmental Microbiology*, Apr. 1991; p. 1031-1037, vol. 57, No. 4.

Büyüksönmez et al., "Optimization of Simultaneous Chemical and Biological Mineralization of Perchoethylene," *Applied and Environmental Microbiology*, Jun. 1999; p. 2784-2788, vol. 65, No. 6.

Maymó-Gatell et al., "Reductive Dechlorination of Chlorinated Ethenes and 1, 2-Dichloroethane by '*Dehalococcoides ethenogenes*' 195," *Applied and Environmental Microbiology*, Jul. 1999; p. 3108-3113, vol. 65, No. 7.

Hamamura et al., "Diversity in Butane Monooxygenases Among Butane-Grown Bacteria," *Applied and Environmental Microbiology*, Oct. 1999; p. 4586-4593, vol. 65, No. 10.

Löffler et al., "16S rRNA Gene-Based Detection of Tetrachloroethene-Dechlorinating *Desulfuromonas* and *Dehalococcoides* Species," *Applied and Environmental Microbiology*, Apr. 2000; p. 1369-1374, vol. 66, No. 4.

Fogel et al., Biodegradation of Chlorinated Ethenes by Methane-Utilizing Mixed Culture, *Applied and Environmental Microbiology*, Apr. 1986, pp. 720-724, vol. 51, No. 4.

Wackett et al., Survey of Microbial Oxygenases: Trichloroethylene Degradation by Propane-Oxidizing Bacteria, *Applied and Environmental Microbiology*, Nov. 1989, pp. 2960-2964, vol. 55, No. 11.

Fox, Status and Trends in Bioremediation Treatment Technology, *Remediation*, Summer 1991, pp. 293-303.

Alvarez-Cohen et al., Characterization of a Methane-Utilizing Bacterium from a Bacterial Consortium That Rapidly Degrades Trichloroethylene and Chloroform, *Applied and Environmental Microbiology*, Jun. 1992, pp. 1886-1893, vol. 58, No. 6.

Chang et al., Transformation Capacities of Chlorinated by Mixed Cultures Enriched on Methane, Propane, Toluene, or Phenol, *Biotechnology and Bioengineering*, Nov. 9, 1994, pp. 440-449, vol. 45.

Kim et al., Aerobic Cometabolism of Chloroform and 1,1,1-Trichloroethane by Butane-Grown Microorganisms, *Bioremediation Journal*, 1997, pp. 135-148, vol. 1, No. 2.

Hamamura et al., Chloroform Cometabolism by Butane-Grown CF8, *Pseudomonas butanovora*, and *Mycobacterium vaccae* JOB5 and Methane-Grown *Methylosinus trichosporium* OB3b, *Applied and Environmental Microbiology*, Sep. 1997, pp. 3607-3613, vol. 63, No. 9.

Steffan et al., Biodegradation of the Gasoline Oxygenates Methyl tert-Butyl Ether, Ethyl tert-Butyl Ether, and tert-Amyl Methyl Ether by Propane-Oxidizing Bacteria, *Applied and Environmental Microbiology*, Nov. 1997, pp. 4216-4222, vol. 63, No. 11.

De Bruin et al., "Complete Biological Reductive Transformation of Tetrachloroethene to Ethane", *Applied and Environmental Microbiology*, Jun. 1992, p. 1996-2000, vol. 58, No. 6. [Abstract].

Mohn et al., "Reductive Dehalogenation of Chlorophenols by Desulfomonile tiedjei DCB-1", *Applied and Environmental Microbiology*, Apr. 1992, p. 1367-1370, vol. 58, No. 4. [Abstract].

So et al., "Initial Reactions in Anaerobic Alkane Degradation by a Sulfate Reducer, Strain AK-01", *Applied and Environmental Microbiology*, Dec. 1999, p. 5532-5540, vol. 65, No. 12. [Abstract].

Haggblom et al., "Influence of Alternative Electron Acceptors on the Anaerobic Biodegradability of Chlorinated Phenols and Benzoic Acids," *Applied and Environmental Microbiology*, Apr. 1993; p. 1162-1167, vol. 59, No. 4. [Abstract].

Ramanand et al., "Reductive Dehalogenation of Chlorinated Benzenes and Toluenes Under Methanogenic Conditions," *Applied and Environmental Microbiology*, Oct. 1993; p. 3266-3272, vol. 59, No. 10. [Abstract].

Coates et al., "Anaerobic Degradation of Polycyclic Aromatic Hydrocarbons in Petroleum-Contaminated Marine Harbor Sediments", *Applied and Environmental Microbiology*, Sep. 1997, p. 3589-3593, vol. 63, No. 9. [Abstract].

So et al., "Isolation and Characterization of a Sulfate-Reducing Bacterium that Anaerobically Degrades Alkanes", *Applied and Environmental Microbiology*, Jul. 1999, p. 2969-2976, vol. 65, No. 7. [Abstract].

Laue et al., "Taurine Reduction in Anaerobic Respiration of Bilophila wadsworthia RZATAU", *Applied and Environmental Microbiology*, May 1997, p. 2016-2021, vol. 63, No. 5. [Abstract].

Wischnak et al., "*Pseudomonas* sp. Strain 273, an Aerobic α,Ω-Dichloroalkane Degrading Bacterium", *Applied and Environmental Microbiology*, Sep. 1998, p. 3507-3511, vol. 64, No. 9. [Abstract].

Ye et al., "Anaerobic Dechlorination of Polychlorobiphenyls (Aroclor 1242) by Pasteurized and Ethanol-Treated Microorganisms from Sediments", *Applied and Environmental Microbiology*, Apr. 1992, p. 1110-1114, vol. 58, No. 4. [Abstract].

Wiegel et al., "Anaerobic Dehalogenation of Hydroxylated Polychlorinated Biphenyls by *Desulfitobacterium dehalogenans*", *Applied and Environmental Microbiology*, May 1999, p. 2217-2221, vol. 65, No. 5. [Abstract].

Wu et al., "Establishment of a Polychlorinated Biphenyl-Dechlorinating Microbial Consortium, Specific for Doubly Flanked Chlorines, in a Defined, Sediment-Free Medium", *Applied and Environmental Microbiology*, Jan. 2000, p. 49-53, vol. 66, No. 1. [Abstract].

Miguez et al., "Monitoring Methanotrophic Bacteria in Hybrid Anaerobic-Aerobic Reactors with PCR and a Catabolic Gene Probe", *Applied and Environmental Microbiology*, Feb. 1999, p. 381-388, vol. 65, No. 2. [Abstract].

Bedard et al., "Brominated Biphenyls Prime Extensive Microbial Reductive Dehalogenation of Aroclor 1260 in Housatonic River Sediment", *Applied and Environmental Microbiology*, May 1998, p. 1786-1795, vol. 64, No. 5. [Abstract].

Wu et al., "Microbial Reductive Dechlorination of Aroclor 1260 in Anaerobic Slurries of Estuarine Sediments", *Applied and Environmental Microbiology*, Mar. 1998, p. 1052-1058, vol. 64, No. 3. [Abstract].

Sanford et al., "Characterization of Desulfitobacterium chlororespirans sp. nov., Which Grows by Coupling the Oxidation of Lactate to the Reductive Dechlorination of 3-chloro-4-hydroxybenzoate", *Applied and Environmental Microbiology*, Oct. 1996, p. 3800-3808, vol. 62, No. 10. [Abstract].

Nicholson et al., "Reductive Dechlorination of Chlorophenols by a Pentachlorophenol-Acclimated Methanogenic Consortium", *Applied and Environmental Microbiology*, Jul. 1992, p. 2280-2286, vol. 58, No. 7. [Abstract].

Von Wintzingerode et al., "Phylogenetic Analysis of an Anaerobic, Trichlorobenzene-Transforming Microbial Consortium", *Applied and Environmental Microbiology*, Jan. 1999, p. 283-286, vol. 65, No. 1. [Abstract].

Bedard et al., "Complete Reductive Dehalogenation of Brominated Biphenyls by Anaerobic Microorganisms in Sediment", *Applied and Environmental Microbiology*, Mar. 1998, p. 940-947, vol. 64, No. 3. [Abstract].

Van Eekert et al., "Degradation and Fate of Carbon Tetrachloride in Unadapted Methanogenic Granular Sludge", *Applied and Environmental Microbiology*, Jul. 1998, p. 2350-2356, vol. 64, No. 7. [Abstract].

Bradley et al., "Anaerobic Oxidation of [1,2-$^{14}$C]Dichloroethene Under Mn(IV)-Reducing Conditions", *Applied and Environmental Microbiology*, Apr. 1998, p. 1560-1562, vol. 64, No. 4. [Abstract].

Fish et al., "Biotransformations of Aroclor 1242 in Hudson River Test Tube Microcosms", *Applied and Environmental Microbiology*, Dec. 1994, p. 4289-4296, vol. 60, No. 12. [Abstract].

Locher et al., "Uptake of 4-Toluene Sulfonate by Comamonas testosteroni T-2", *J. Bacteriol.*, Feb. 1993, p. 1075-1080, vol. 175, No. 4. [Abstract].

Sun et al., "Isolation and Characterization of *Desulfovibrio dechloracetivorans* sp. nov., a Marine Dechlorinating Bacterium Growing by Coupling the Oxidation of Acetate to the Reductive Dechlorination of 2-Chlorophenol", *Applied and Environmental Microbiology*, Jun. 2000, p. 2408-2413, vol. 66, No. 6. [Abstract].

Boyle et al., "Isolation from Estaurine Sediments of a *Desulfovibrio* Strain Which Can Grow on Lactate Coupled to the Reductive Dehalogenation of 2,4,6-Tribromophenol", *Applied and Environmental Microbiology*, Mar. 1999, p. 1133-1140, vol. 65, No. 3. [Abstract].

Cole et al., "Isolation and Characterization of a Novel Bacterium Growing Via Reductive Dehalogenation of 2-Chlorophenol", *Applied and Environmental Microbiology*, Oct. 1994, p. 3536-3542, vol. 60, No. 10. [Abstract].

Dojka et al., "Microbial Diversity in a Hydrocarbon- and Chlorinated-Solvent-Contaminated Aquifer Undergoing Intrinsic Bioremediation", *Applied and Environmental Microbiology*, Oct. 1998, p. 3869-3877, vol. 64, No. 10. [Abstract].

Hur et al., "Metabolism of Chlorofluorocarbons and Polybrominated Compounds by *Pseudomonas putida* G786(pHG-2) via an Engineered Metabolic Pathway", *Applied and Environmental Microbiology*, Nov. 1994, p. 4148-4154, vol. 60, No. 11. [Abstract].

Epa, "Sequential Anaerobic/Aerobic Biodegradation of PCE at Watertown, Massachusetts", Cost and Performance Report, Mar. 2000.

Holliger et al., "A Highly Purified Enrichment Culture Couples the Reductive Dechlorination of Tetrachloroethene to Growth", *Applied and Environmental Microbiology*, Sep. 1993, p. 2991-2997, vol. 59. No. 9. [Abstract].

Madsen et al., "Isolation and Characterization of an Anaerobic Chlorophenol-Transforming Bacterium", *Applied and Environmental Microbiology*, Sep. 1992, p. 2874-2878, vol. 58, No. 9. [Abstract].

Mohn et al., "Limited Degradation of Chlorophenols by Anaerobic Sludge Granules", *Applied and Environmental Microbiology*, Jul. 1992, p. 2131-2136, vol. 58, No. 7. [Abstract].

Baker et al., *Bioremediation*, pp. 303-304, McGraw-Hill, Inc., 1994.

www.biobutane.com/may2000.htm (downloaded on Nov. 18, 2002) dated May 1, 2000.

www.biobutane.com/march2000.htm (downloaded on Nov. 18, 2002) dated Mar. 1, 2000.

Global BioSciences, Inc. Powerpoint® brand audiovisual presentation (downloaded from web on Nov. 18, 2002), undated.

Air & Waste Management Association Show New Products information sheet (posted Jun. 25, 1999) at www.pollutionengineering.com/events/conferences/awma99/awmanp6.htm (downloaded Nov. 18, 2002).

Wilson et al., "Biological Treatment of Trichloroethylene and 1,1,1-Trichloroethane from Contaminated Air Streams", Proceedings of Petroleum Hydrocarbons and Organic Chemicals in Ground Water: Prevention, Detection and Restoration (The Westin Galleria, Houston, Nov. 9-11, 1988), v2, pp. 823-831, published in 1989.

Wilson et al., "Biotransformation of Trichloroethylene in Soil," *Applied and Environmental Microbiology*, Jan. 1985; p. 242-243, vol. 49, No. 1.

Nelson et al., "Aerobic Metabolism of Trichloroethylene by a Bacterial Isolate," *Applied and Environmental Microbiology*, Aug. 1986, p. 383-384, vol. 52.

Little et al., "Trichloroethylene Biodegradation by a Methane-Oxidizing Bacterium," *Applied and Environmental Microbiology*, Apr. 1988, p. 951-956, vol. 54.

Arciero et al. "Degradation of Trichloroethylene by the Ammonia-Oxidizing Bacterium *Nitrosomonas europaea*," *Biochemical and Biophysical Research Communications*, Mar. 15, 1989; p. 640-643, vol. 159, No. 2.

Oldenhuis et al., "Degradation of Chlorinated Aliphatic Hydrocarbons by *Methylosinus trichosporium* OB3b Expressing Soluble Methane Monooxygenase," *Applied and Environmental Microbiology*, Nov. 1989; p. 2819-2826, vol. 55, No. 11.

Tsien et al., "Biodegradation of Trichloroethylene by *Methylosinus trichosporium* OB3b," *Applied and Environmental Microbiology*, Dec. 1989; p. 3155-3161, vol. 55, No. 12.

Vannelli et al., "Degradation of Halogenated Aliphatic Compounds by the Ammonia-Oxidizing Bacterium *Nitrosomonas europaea*," *Applied and Environmental Microbiology*, Apr. 1990; p. 1169-1171, vol. 56, No. 4.

Folsom et al. "Phenol and Trichloroethylene Degradation by *Pseudomonas cepacia* G4: Kinetics and Interactions Between Substrates," *Applied and Environmental Microbiology*, May 1990; p. 1279-1285, vol. 56, No. 5.

* cited by examiner

WASTEWATER TREATMENT WITH ALKANES

CROSS REFERENCE TO RELATED APPLICATIONS

This application is a continuation-in-part of U.S. patent application Ser. No. 09/924,791 filed Aug. 8, 2001 now U.S. Pat. No. 6,669,846, which claims the benefit of U.S. Provisional Patent Application Ser. No. 60/291,165 filed May 15, 2001. This application is also a continuation-in-part of U.S. application Ser. No. 09/729,039 filed Dec. 4, 2000, now U.S. Pat. No. 6,488,850 issued Dec. 3, 2002, which is a continuation-in-part of U.S. application Ser. No. 09/275,320 filed Mar. 24, 1999, now U.S. Pat. No. 6,245,235 issued Jun. 12, 2001, which is a continuation-in-part of U.S. application Ser. No. 08/767,750 filed Dec. 17, 1996, now U.S. Pat. No. 5,888,396 issued Mar. 30, 1999. The Ser. No. 09/729,039 application also claims the benefit of U.S. Provisional Application Ser. No. 60/234,482 filed Sep. 22, 2000. All of the foregoing applications and patents are incorporated herein by reference.

FIELD OF THE INVENTION

The present invention relates to the treatment of wastewater, and more particularly relates to the use of alkanes to aerobically and/or anaerobically treat municipal, agricultural and industrial wastewater.

BACKGROUND INFORMATION

Liquid wastes are produced by most human activities including domestic sewage, agricultural processes and industrial operations. For example, according to the U.S. Department of Commerce, industrial water users discharge approximately 285 billion gallons of wastewater daily.

Some types of conventional wastewater treatment processes are microbiologically mediated. Municipal, agricultural and industrial wastewater is often treated aerobically, thereby converting pollutants into environmentally acceptable analogues. The addition of micro-bubbles of oxygen has been demonstrated to be an effective enhancement of the aerobic treatment of wastewater to lower biological oxygen demand (BOD), total dissolved solids (TDS) and total organic carbon (TOC).

Anaerobic wastewater treatment methods have also been used. For example, the addition of hydrogen has been found to enhance anaerobic processes, and to reduce unsaturated organic liquids and sludges. Anaerobic digestion is one of the oldest processes used for the stabilization of sludges. It involves the decomposition of organic matter and inorganic matter in the absence of molecular oxygen. During conventional anaerobic digestion, the organic matter in mixtures of primary settled and biological sludges is converted biologically, under anaerobic conditions, to produce methane ($CH_4$) and carbon dioxide ($CO_2$). During conventional anaerobic digestion, a consortium of organisms converts organic sludges and wastes. One group hydrolyzes organic polymers and lipids. A second group of anaerobic bacteria ferments the breakdown products to simple organic acids. A third group of microorganisms converts the hydrogen and acetic acid to methane gas and carbon dioxide.

Gas-liquid mixing systems are used in various processes and methods employed in the wastewater industries. Many types of mechanical devices and mixers have been developed to improve wastewater treatment by enhancing gas-liquid mixing. By enhancing gas-liquid mixing, wastewater aerobic treatment processes are improved through increased oxygen (aerobic) and hydrogen (anaerobic) dissolution and residence time.

U.S. Pat. Nos. 5,916,491 and 5,925,290, which are incorporated herein by reference, disclose apparatus and methods for mixing gas and liquid through vortex or venturi devices. The mixers are particularly suited for mixing oxygen-containing gases into industrial and municipal wastewater. Other types of gas-liquid mixers are also disclosed in U.S. Pat. Nos. 3,969,446, 4,328,175, 4,454,077, Re. 32,562, 4,645,603, 4,695,378, 4,956,080, 5,061,406, 5,073,309, 5,085,809, 5,314,076 and 5,494,576, which are incorporated herein by reference.

The bioremediation of various pollutants such as chlorinated solvents and other types of pollutants using butane-utilizing bacteria is disclosed in U.S. Pat. Nos. 5,888,396, 6,051,130, 6,110,372, 6,156,203, 6,210,579 and 6,245,235 which are incorporated herein by reference.

SUMMARY OF THE INVENTION

In accordance with the present invention, alkanes, e.g., methane, ethane, propane and butane, can be used to effectively degrade pollutants and other materials typically found in wastewater such as chemical, industrial and municipal effluents. In a preferred embodiment, butane, having the highest solubility of the alkanes, can be used to control BOD, TOC and TDS, as well as pollutants typically found in wastewater through enhanced growth of aerobic and/or anaerobic bacteria, and possibly other microorganisms that oxidize or reduce dissolved organic matter and sludge effluents, thereby significantly decreasing the BOD of a wastestream.

Alkanes, preferably butane, may be used under aerobic and/or anaerobic conditions to enhance wastewater treatment processes during primary, secondary or tertiary treatment. Butane is highly soluble and ideally suited to serve as a microbial growth substrate, thereby significantly increasing the heterogeneous microbial community and total heterotrophic microbial population found in wastewater. This enhanced microbial population may rapidly absorb and mineralize the dissolved organic nutrients in the wastestream. To accelerate the dissolved organic nutrient reductions, the butane may be pulsed in the wastestream to create feeding frenzy/starvation cycles. After the initial growth phase, the organic matter available in the wastewater effluent may be rapidly decreased thereby reducing the BOD, TOC and TDS.

An aspect of the present invention is to provide a method of treating wastewater comprising introducing a butane substrate into the wastewater.

Another aspect of the present invention is to provide a method of treating material contained in wastewater. The method comprises stimulating growth of butane-utilizing bacteria, and allowing the butane-utilizing bacteria to degrade at least a portion of the material.

A further aspect of the present invention is to provide a method of treating municipal wastewater comprising introducing a butane substrate into the wastewater.

Another aspect of the present invention is to provide a method of treating material contained in municipal wastewater comprising stimulating growth of butane-utilizing bacteria, and allowing the butane-utilizing bacteria to degrade at least a portion of the municipal wastewater material.

A further aspect of the present invention is to provide a method of reducing odor of municipal wastewater comprising introducing butane to the municipal wastewater.

Another aspect of the present invention is to provide an apparatus for treating wastewater comprising means for introducing a butane substrate into the wastewater.

A further aspect of the invention is to provide an apparatus for treating wastewater comprising a wastewater containment vessel, a source of an alkane, and at least one alkane injector in flow communication with the wastewater containment vessel.

These and other aspects of the present invention will be more apparent from the following description.

DETAILED DESCRIPTION

Figure 1:
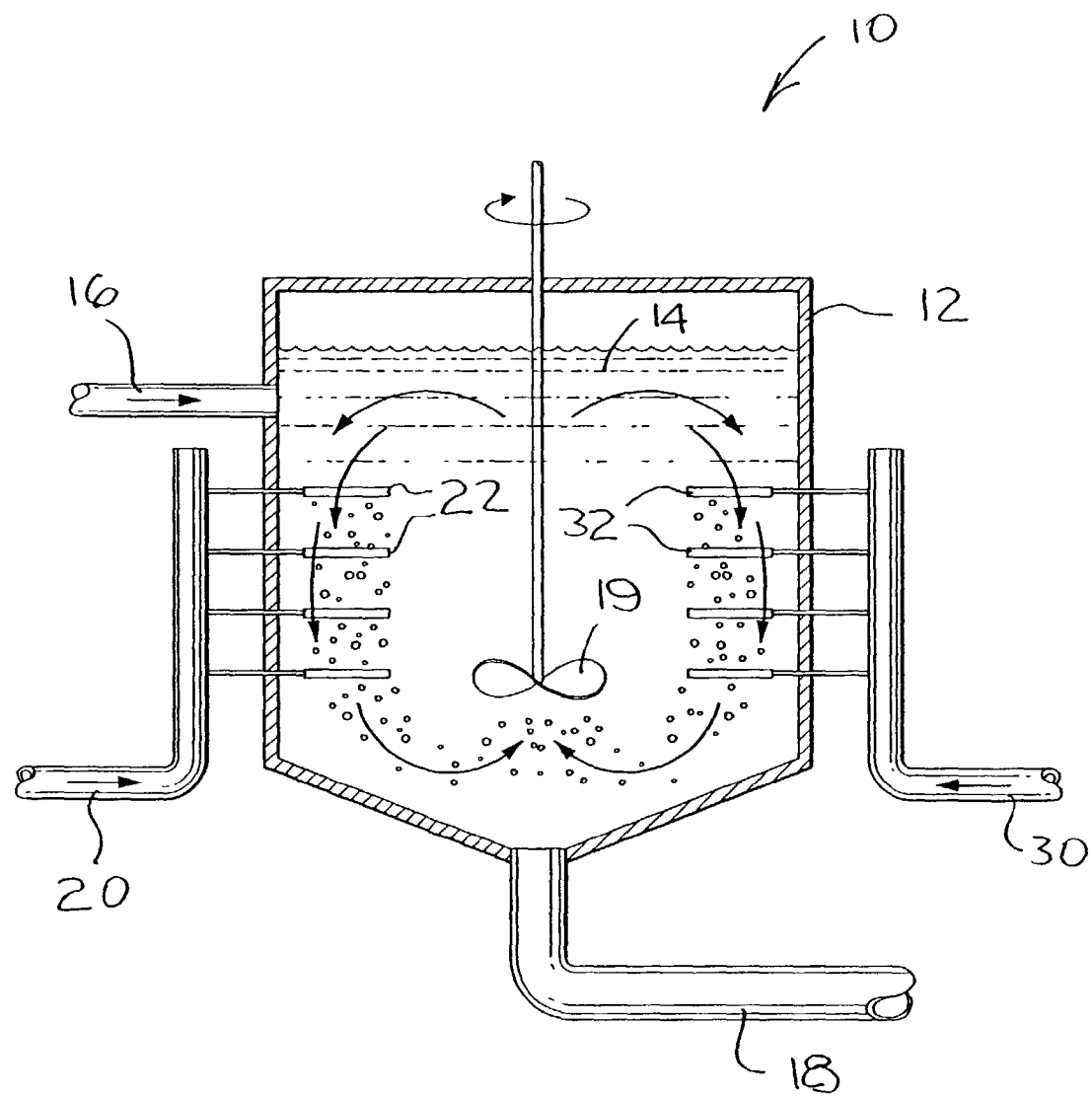
FIG. 1 is a partially schematic side view of an alkane aerobic digester in accordance with an embodiment of the present invention.

In accordance with the present invention, aerobic and/or anaerobic digestion with alkane-utilizing bacteria is used to treat wastewater materials, such as organic sludges produced from various treatment processes. In accordance with a preferred embodiment of the present invention, butane, which has relatively high solubility, rapidly dissolves in wastewater, thereby significantly increasing heterogeneous microbial communities and heterotrophic microbial populations. Butane is a low molecular weight organic compound ideally suited to serve as a microbial food substrate under aerobic and/or anaerobic conditions. Butane is non-toxic and may be added, for example, as an amendment in a primary settling tank, aeration tank or secondary settling tank.

In accordance with an embodiment of the present invention, a butane substrate may be added to the wastewater to be treated. A preferred embodiment of the present invention relates to the treatment of wastewater BOD, TDS and sludge. For example, a butane substrate may be injected into the wastewater in a large treatment vessel equipped with oxygen injectors and turbulent mixing devices. In one embodiment of the present invention, the wastewater comprises municipal wastewater, e.g., wastewater from municipal sewage systems that is treated in municipal wastewater treatment plants. The butane substrate may be provided in any desired form, such as a liquid or gas injected into the wastewater, or within a capsule that dissolves in the wastewater.

As used herein, the term "butane substrate" includes liquids and gases in which butane is present in sufficient amounts to stimulate growth of butane-utilizing bacteria. Butane is preferably the most prevalent compound of the butane substrate on a weight percent basis, and typically comprises at least about 10 weight percent of the butane substrate. The other constituents of the butane substrate may include any suitable compounds, including other alkanes such as methane, ethane and propane. Inert gases may be added to the butane substrate, e.g., as a pusher gas to facilitate delivery of the butane substrate to the treatment zone. The butane substrate preferably comprises at least about 50 weight percent butane. More preferably, the butane substrate comprises at least about 90 weight percent butane. In a particular embodiment, the butane substrate comprises at least about 99 weight percent n-butane. The butane may contain straight (n-butane) and/or branched chain compounds.

Oxygen may be introduced into the wastewater during at least a portion of the treatment time. As used herein, the term "oxygen-containing gas" means gases which comprise oxygen, including pure oxygen as well as mixtures of oxygen with other gases. For example, the oxygen-containing gas may comprise air, pure oxygen, or oxygen blended with inert gases such as helium, argon, nitrogen, carbon monoxide or the like.

Although the use of a butane substrate is primarily described herein, it is to be understood that other alkanes, i.e., methane, ethane and/or propane, may be used in addition to, or in place of, butane. For example, natural gas may be used as a food source. Furthermore, alternative food sources may be used in addition to, or in place of, the alkanes. Examples of alternate food sources include agars, simple and complex sugars, carbohydrates, carbon sources, milk products, egg albumin, egg products, blood serums, urea, urea broth, beet molasses, glucose, xylose and glucose, xylose, mannose, lactate, mannitol, yeast extract, sorbitol, wheat bran, straw, molasses, cereals, corn, potato starch, corn cob, fish meal, grain, gelatin, corn steep liquor, corn meal, nutrient gelatin, rice bran, casein hydrolysate, ethanol, agricultural residues, peat moss hydrolysate, lactose, sugarcane syrup, synthetic ethanol, gasoline, petroleum distillates, aliphatic and aromatic hydrocarbons, non-petroleum compounds, fructose, fatty acids, proteins, cellulose, engineered biological fuel components, nitrates/nitrites/ammonia, maltose, sucrose, starch, acetate, glycerol, soluble starch, amino acids, casamino acids, meat extracts, organic acids, barley, barley malt, blood meal, cane (black strap) molasses, cerelose, CFS concentrate, corn gluten meal, cotton seed meal, dried distillers' solubles, edamine, enzose, fermamin, fish solubles, fish meal, linseed meal, meat and bone meal, NZ-Amine B, oat flour, peanut meal and hulls, pharmamedia, rice flour, soybean meal, wheat flour, whey powder, brewers' yeast, yeast hydrolysate, yeast tortula, arabinose, fumarate, pyruvate, succinate, phosphate, galactose, glycol, crotonate, glutamate, arginine, ribose, methanol, propanol, fuel oils, all volatile petroleum hydrocarbons (VPH) and all extractable petroleum hydrocarbons (EPH) including the $C_5$–$C_8$ aliphatic range, $C_9$–$C_{12}$ aliphatic range, $C_9$–$C_{10}$ aromatic range, $C_{11}$–$C_{22}$ aromatic range, $C_9$–$C_{18}$ aliphatic range, $C_{19}$–$C_{36}$ aliphatic range, $C_{36}$ and higher aliphatic range, benzene, toluene, ethylbenzene, xylenes, naphthalene, polynuclear (1, 2, 3 rings and higher) hydrocarbons (PAHs), butyrate, butylaldehyde, butanol, 1-butanol, 2-butanol, pentane, nonane, styrene, octane, n-octane, organic compounds, alcohols, hexadecanol, ethylene glycol, microbial metabolites, carboxylic acids, acids, such as formic, acetic, propionic, oxalic, acrylic, methacrylic, mineral spirits, mineral oils, petroleum jellies, aldehydes, mushroom extracts, mushrooms, aliphatic amines, aromatic amines, ethers, aliphatic and aromatic esters, glycol ethers, ketones, grain dust, phenols, cheese whey, gas oils, cellulose-pulping, carbon dioxide, gas and oil, carob bean extract, waste starch, fermentation products, endogenous oxidized cell tissue, high molecular mass compounds, cell protoplasm, dead microbial cells, wood, wood chips, sawdust, coal and coal dust.

In accordance with a preferred embodiment, butane availability results in the selection of robust and diverse microbial populations. These enhanced microbial populations may rapidly absorb and mineralize the dissolved organic nutrients in the wastestream. After this initial growth phase, the organic matter available in the wastewater effluent will be rapidly decreased thereby reducing the BOD, TDS and sludge components.

Typically, during aerobic digestion, in a process known as endogenous respiration, as an available food substrate is depleted, the microorganisms begin to consume their own protoplasm to obtain energy for cell maintenance reactions as shown by the following equation:

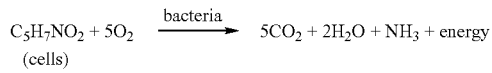

$$C_5H_7NO_2 + 5O_2 \xrightarrow{\text{bacteria}} 5CO_2 + 2H_2O + NH_3 + \text{energy}$$
(cells)

For example, if activated or trickling filter sludge is mixed with primary sludge and the combination is to be aerobically digested, there will be both direct oxidation of the organic matter in the primary sludge and endogenous oxidation of the cell tissue as the readily available organic matter is depleted. One consequence of butane availability in a wastestream, e.g., by cycling or pulsing, is to accelerate oxidation of the organic matter by reducing endogenous respiration. Another benefit of butane availability is the direct result of the increase in cell densities and the microbiological diversity resulting under butane tension. This increased microbiological community will further enhance organic matter digestion.

The butane aerobic digesters may be used, for example, to treat waste-activated or trickling-filter sludge, mixtures of waste-activated or trickling-filter sludge and primary sludge, and/or waste sludge from activated-sludge treatment plants designed without primary settling.

In addition to dissolved solids removal, the butane/oxygen process may be used to accelerate sludge decomposition and reduction. High oxygen concentrations may be maintained for microbial proliferation and to reduce bulking of the sewage sludge. For example, by retrofitting existing conventional wastewater treatment tanks, a butane aerobic digester may be added into the process flow during any stage of the overall treatment process. Settled and dissolved biomass may be continuously recycled to maximize the rate of aerobic digestion. Since many wastewater facilities include aeration tanks equipped with mixers and air and/or oxygen injection diffusers, the system retrofit may simply include the addition of butane injectors such as ports and/or diffusers. Likewise, conventional anaerobic digesters may be converted to butane anaerobic digesters through the addition of butane injectors.

In accordance with an embodiment of the present invention, alkane-utilizing bacteria may be used to anaerobically treat wastewater materials. For example, butane may serve as an electron donor to degrade recalcitrant compounds under anaerobic conditions through reductive dechlorination processes. Under anaerobic conditions, butane availability may increase enzyme-mediated biotransformations, such that higher-molecular-mass compounds are converted into compounds suitable for use as a source of energy and cell carbon. Butane may thus serve as an electron donor to degrade recalcitrant compounds under anaerobic conditions.

Figure 2:
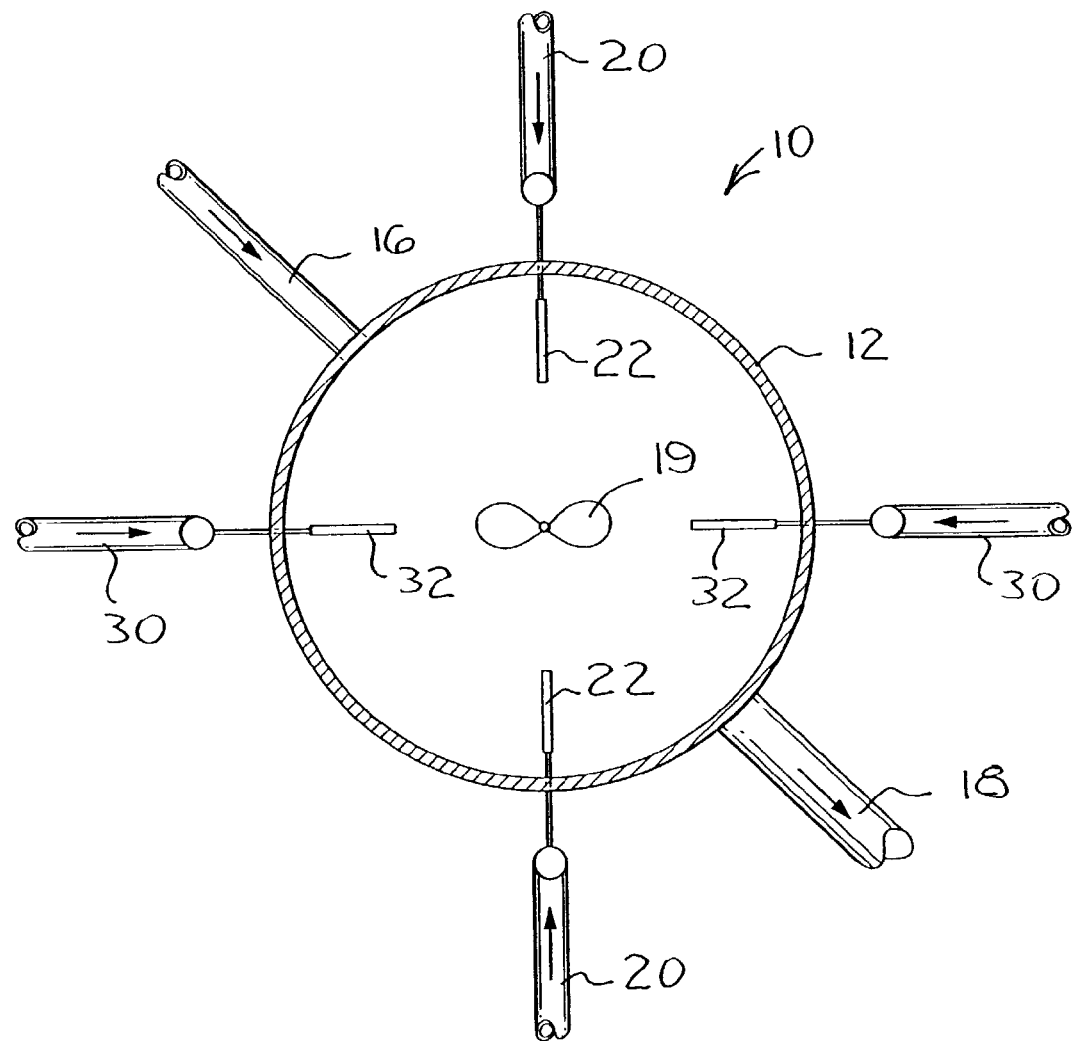
FIG. 2 is a top view of the alkane aerobic digester of FIG. 1.

FIG. 1 is a partially schematic side view of an aerobic butane digester 10 in accordance with an embodiment of the present invention. FIG. 2 is a plan view of the aerobic butane digester 10 shown in FIG. 1. The digestor 10 includes a vessel 12 which contains wastewater 14. A wastewater feed line 16 feeds the wastewater into the vessel 12. A solids removal line 18 permits the removal of solids and other materials from the vessel 12. An impeller 19 is mounted in the vessel 12. An alkane injection line 20 is connected to diffusers 22 inside the vessel 12. An oxygen-containing gas injection line 30 is connected to diffusers 32 inside the vessel 12. As shown most clearly in FIG. 1, during operation of the aerobic butane digestor 10, the impeller 19 is rotated in order to circulate the wastewater 14 within the vessel 12. The alkane and oxygen-containing gas are introduced into the wastewater 14 through the diffusers 22 and 32, respectively. The alkane is typically introduced in the wastewater 14 in pulses or intervals. The oxygen-containing gas may be injected into the wastewater 14 continuously or intermittently.

Figure 3:
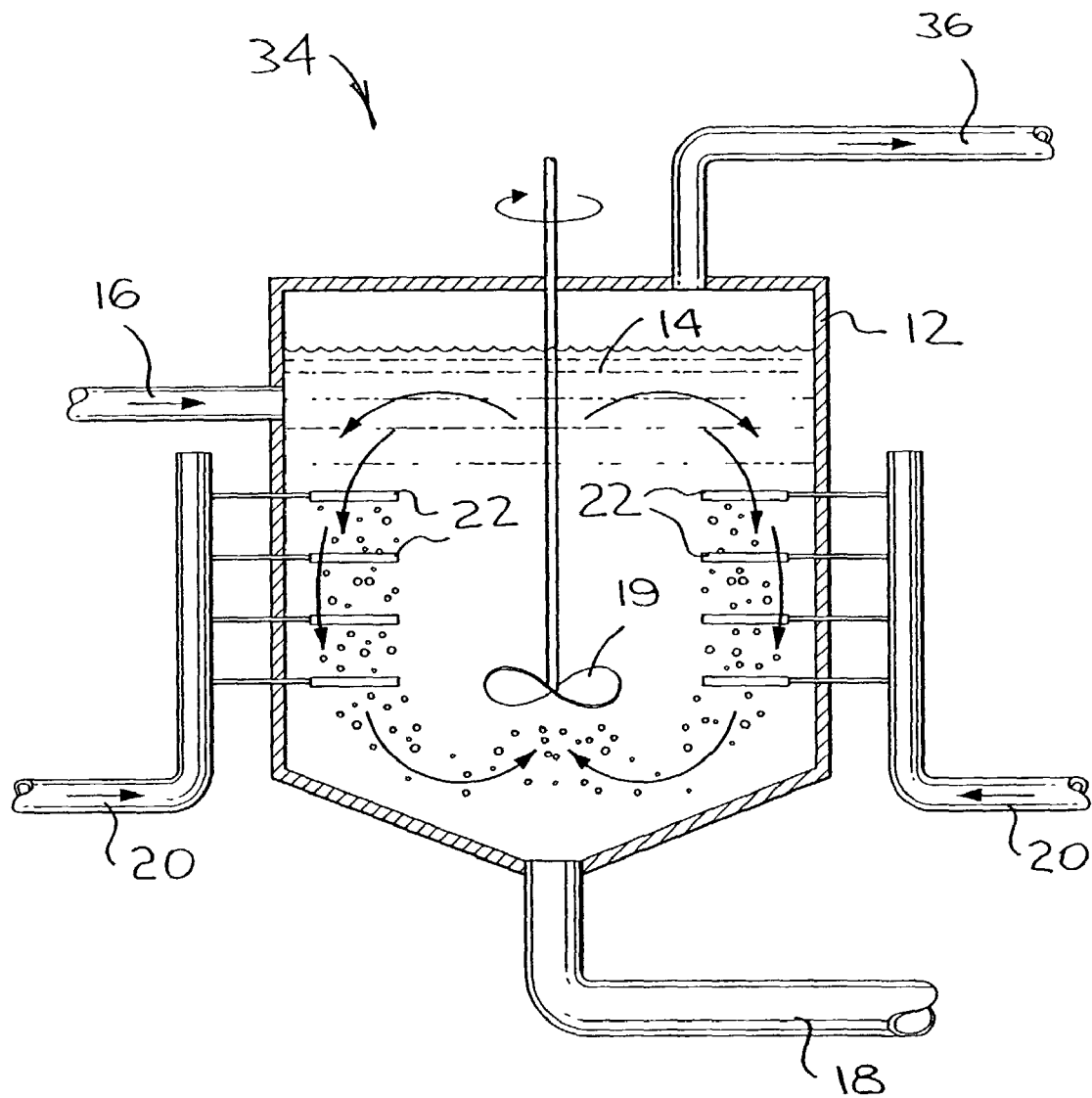
FIG. 3 is a partially schematic side view of an alkane anaerobic digester in accordance with an embodiment of the present invention.
Figure 4:
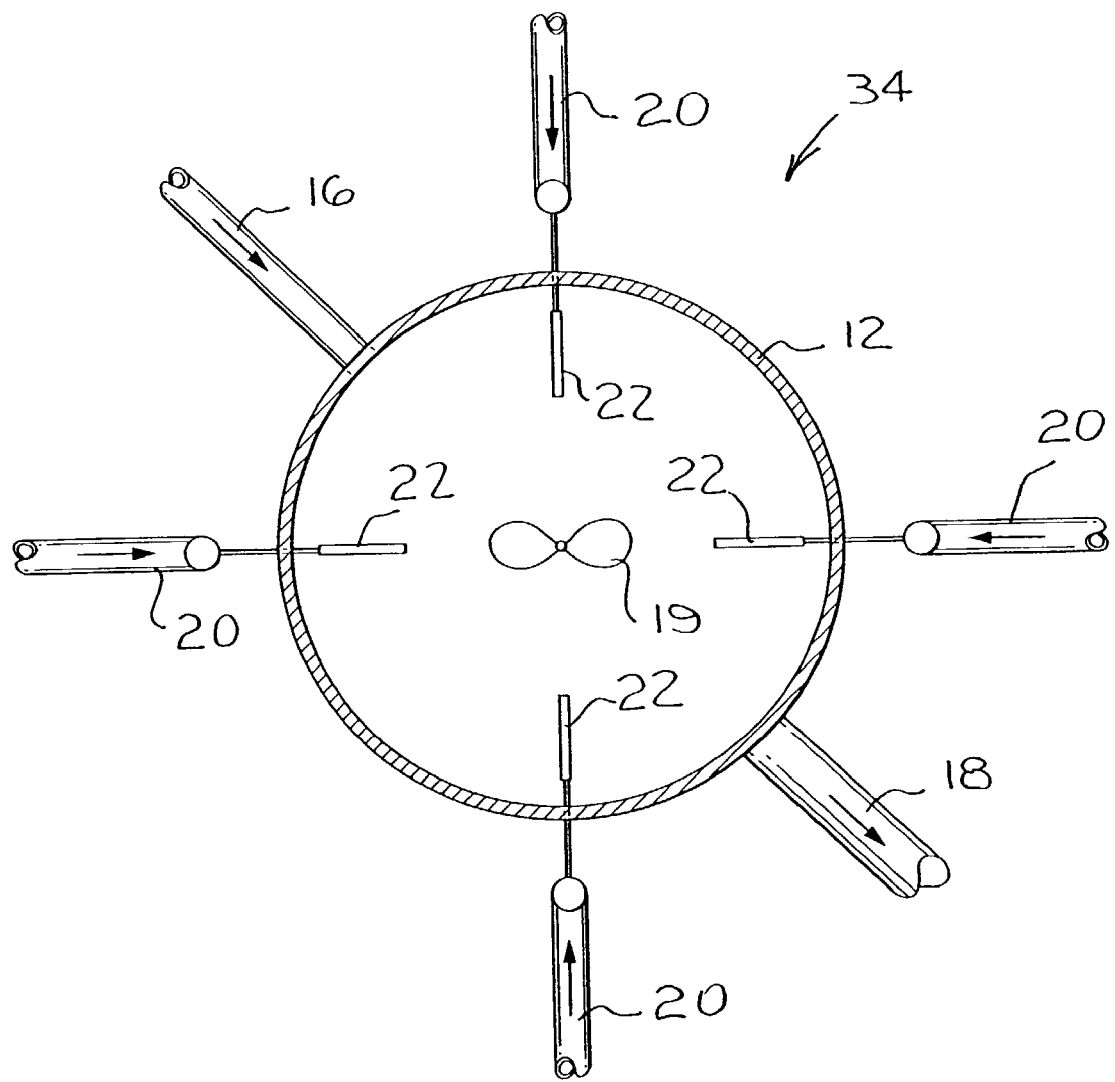
FIG. 4 is a top view of the alkane anaerobic digester of FIG. 3.

FIGS. 3 and 4 are partially schematic side and plan views, respectively, of an anaerobic butane digestor 34 in accordance with an embodiment of the present invention. The anaerobic butane digestor 34 shown in FIGS. 3 and 4 is similar to the digestor shown in FIGS. 1 and 2, except the oxygen-containing gas injection lines are replaced with additional alkane injection lines 20. The anaerobic butane digestor 34 also includes a vent line 36. During operation of the anaerobic butane digestor 34, the impeller 19 likewise rotates to circulate the wastewater 14, while the alkane is introduced into the wastewater 14 with the diffusers 22. The alkane may be introduced into the wastewater 14 continuously intermittently.

In addition to the embodiments shown in FIGS. 1–4, conventional gas-liquid mixers may be adapted or modified to allow for the injection of butane or other alkanes into the treatment zone. For example, gas-liquid mixers as disclosed in U.S. Pat. Nos. 5,916,491 and 5,925,290 may be modified to introduce butane at any desired location(s) in the liquid stream, for example, inside the draft tube of the mixers.

Figure 5:
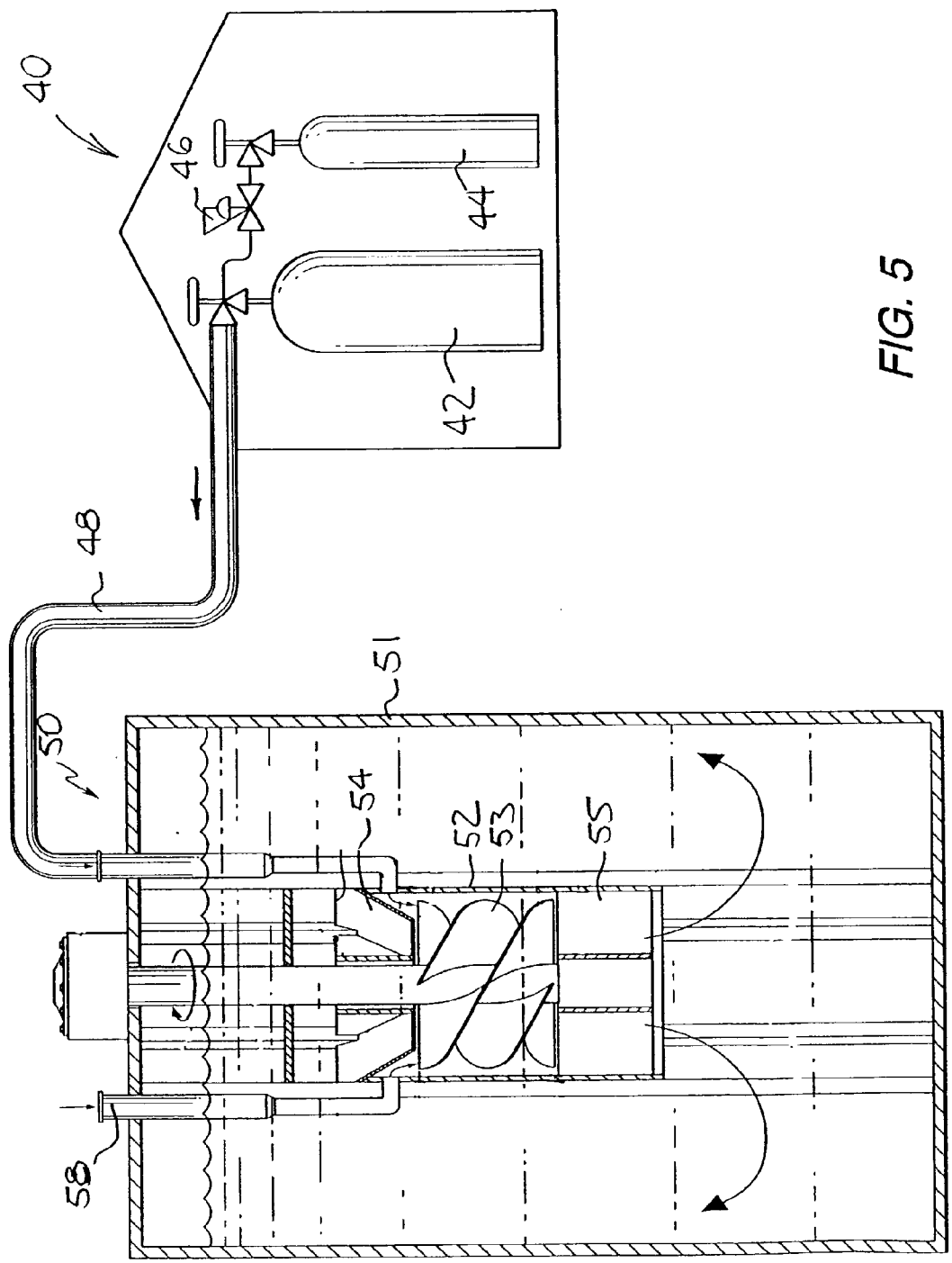
FIG. 5 is a partially schematic side view of a gas-liquid mixer including an alkane injection system in accordance with an embodiment of the present invention.

FIG. 5 is a partially schematic side view of a gas-liquid mixer 50 including an alkane injection system 40 in accordance with an embodiment of the present invention. The alkane injection system 40 includes an alkane cylinder 42 and an inert gas cylinder 44 which may contain a gas such as helium. A regulator 46 is connected between the alkane cylinder 42 and the inert gas cylinder 44. An alkane injection line 48 connects the alkane injection system 40 to the mixer 50. The mixer 50 includes a wastewater containment vessel 51. A draft tube 52 and an impeller 53 are positioned in the wastewater containment vessel 51. A conical inlet baffle 54 is located at the top of the draft tube 52, while an outlet baffle 55 is located at the bottom of the draft tube 52. An air injection line 58 extends into the draft tube 52 below the conical inlet baffle 54. During operation of the system shown in FIG. 5, rotation of the impeller 53 draws wastewater vertically downward through the draft tube 52. Alkanes delivered through the injection line 48 and air delivered through the air injection line 58 mix with the wastewater inside the draft tube 52.

Figure 6:
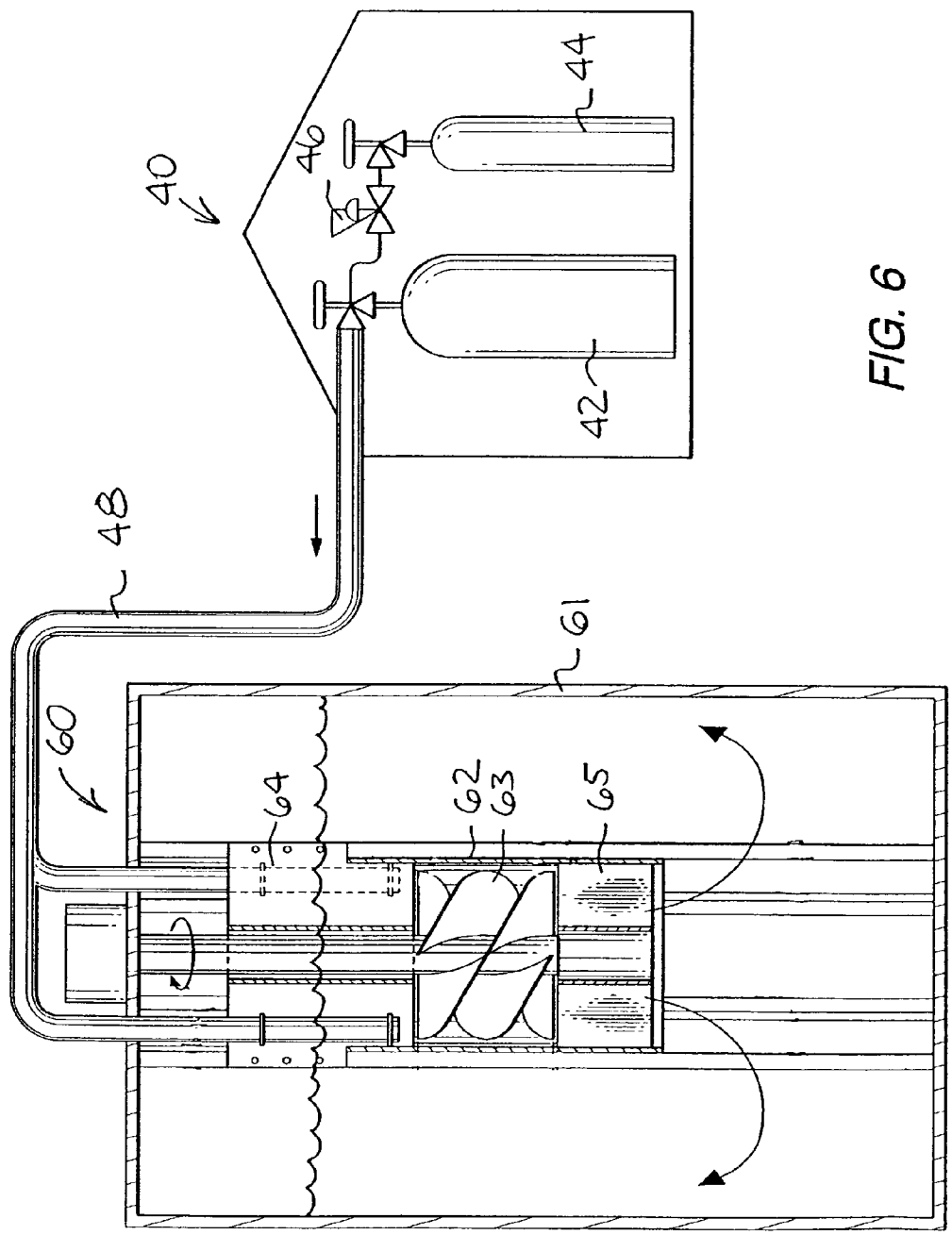
FIG. 6 is a partially schematic side view of a gas-liquid mixer including an alkane injection system in accordance with another embodiment of the present invention.
Figure 7:
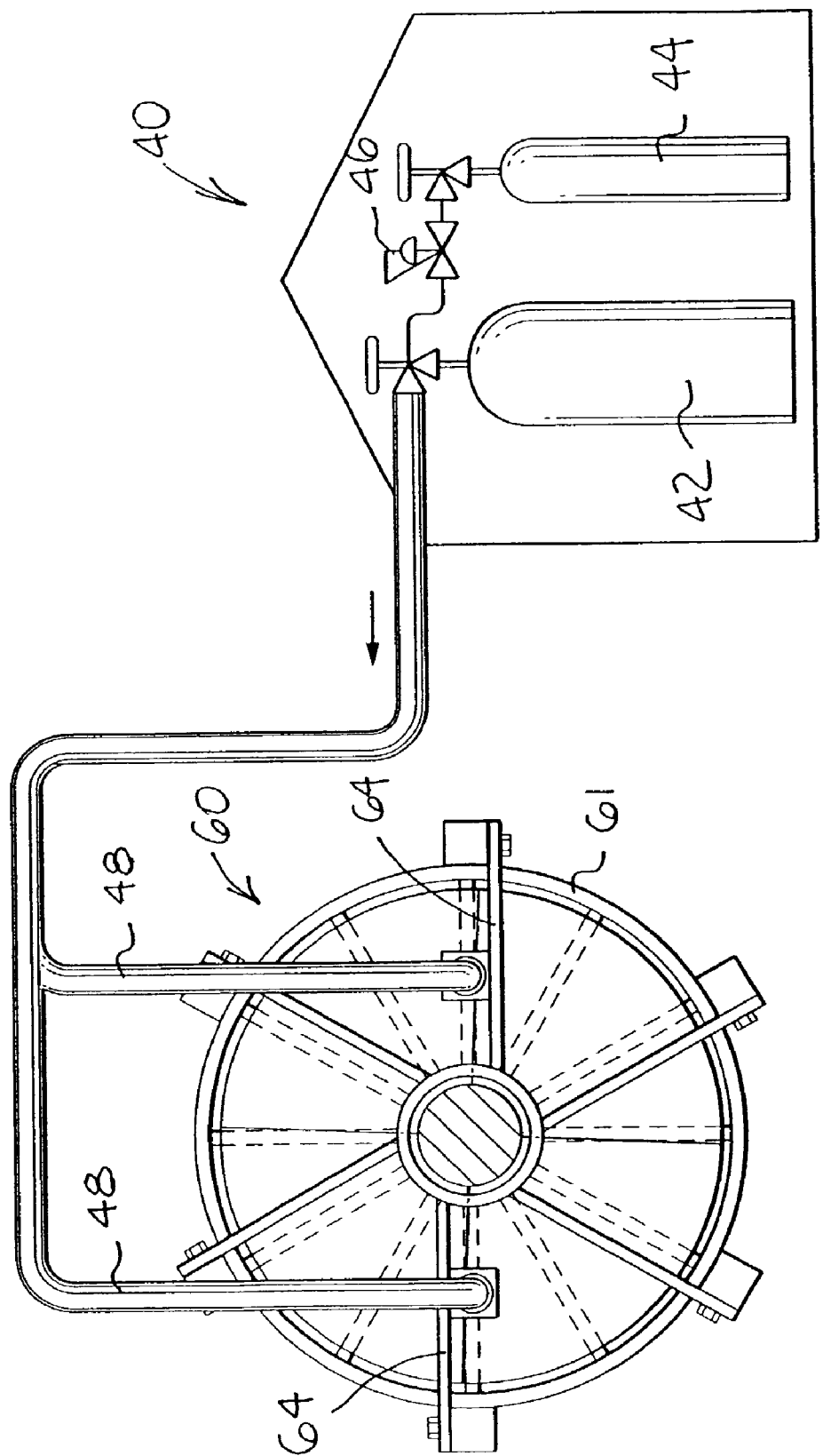
FIG. 7 is a top view of the gas-liquid mixer of FIG. 6.

FIG. 6 is a partially schematic side view and FIG. 7 is a top view of a gas-liquid mixer including an alkane injection system 40 in accordance with another embodiment of the present invention. The alkane injection system 40 shown in FIGS. 6 and 7 is similar to the system shown in FIG. 5. In the embodiment shown in FIGS. 6 and 7, the gas-liquid mixer 60 includes a wastewater containment vessel 61 having a draft tube 62 with an impeller 63 mounted therein. An inlet baffle 64 is mounted at the top of the draft tube 62, while an outlet baffle 65 is mounted at the bottom of the draft tube 62. During operation of the mixer 60 shown in FIGS. 6 and 7, rotation of the impeller 63 draws the wastewater through the draft tube 62, and also causes air-filled vortices to form, thereby entraining air as the wastewater is drawn through the draft tube 62. Alkanes fed through the alkane injection lines 48 are also entrained in the wastewater as it is drawn through the draft tube 62.

Figure 8A:
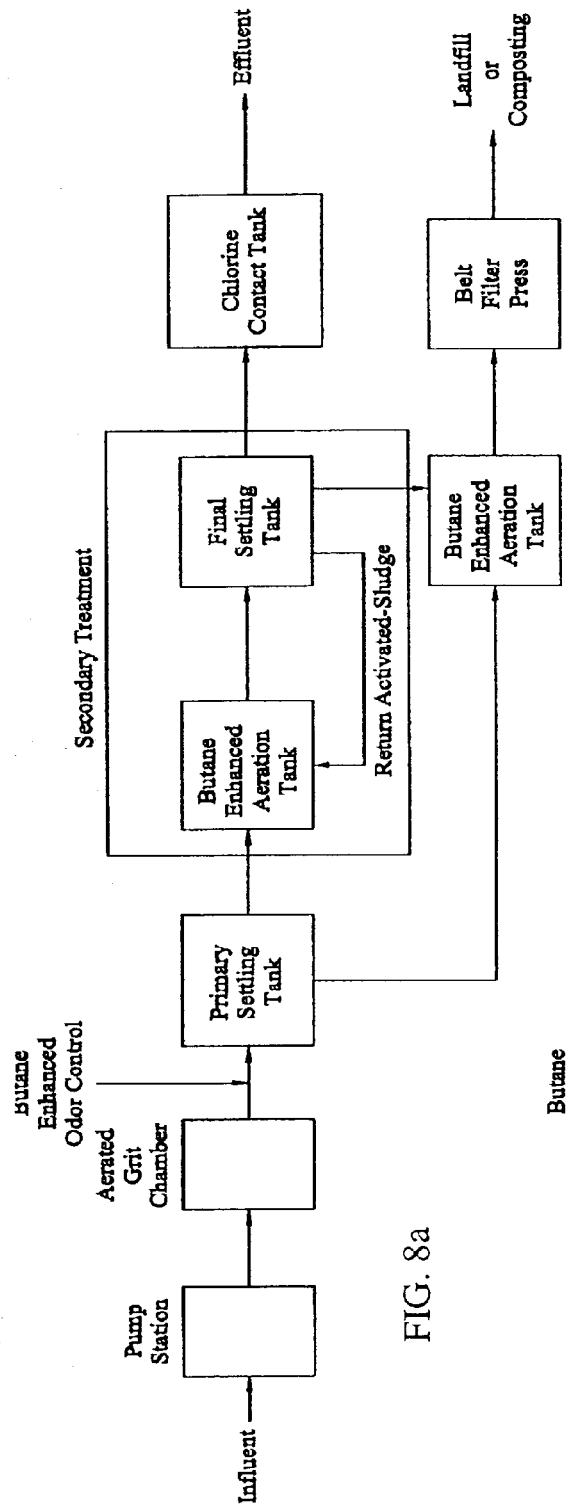
FIGS. 8a and 8b are schematic diagrams illustrating a butane-enhanced wastewater treatment process in accordance with embodiments of the present invention.
Figure 8B:
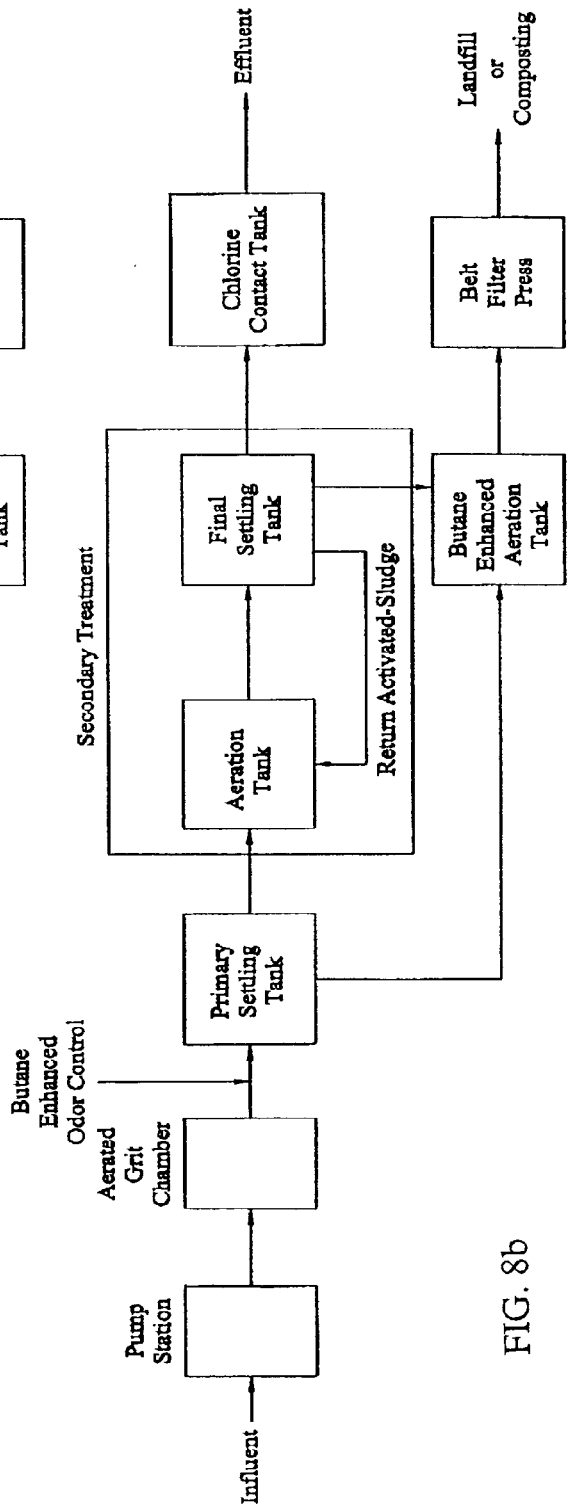

FIG. 8a is a schematic diagram illustrating a butane-enhanced wastewater treatment process in accordance with an embodiment of the present invention. In the embodiment shown in FIG. 8a, butane-enhanced odor control is achieved by introducing butane into the wastewater prior to the primary settling tank. After the primary settling tank, the wastewater may flow to a butane-enhanced aeration tank, then to a belt filter press. In addition, wastewater from the primary settling tank may be fed to a butane-enhanced aeration tank for secondary treatment. In the secondary treatment stage, return activated sludge is fed to the butane-aeration tank and then to a final settling tank. After the final settling tank, the wastewater may be fed to a chlorine contact tank and/or another butane-enhanced aeration tank. The embodiment shown in FIG. 8b is similar to the embodiment shown in FIG. 8a, except the secondary treatment stage includes a standard aeration tank, rather than a butane-enhanced aeration tank.

Figure 9:
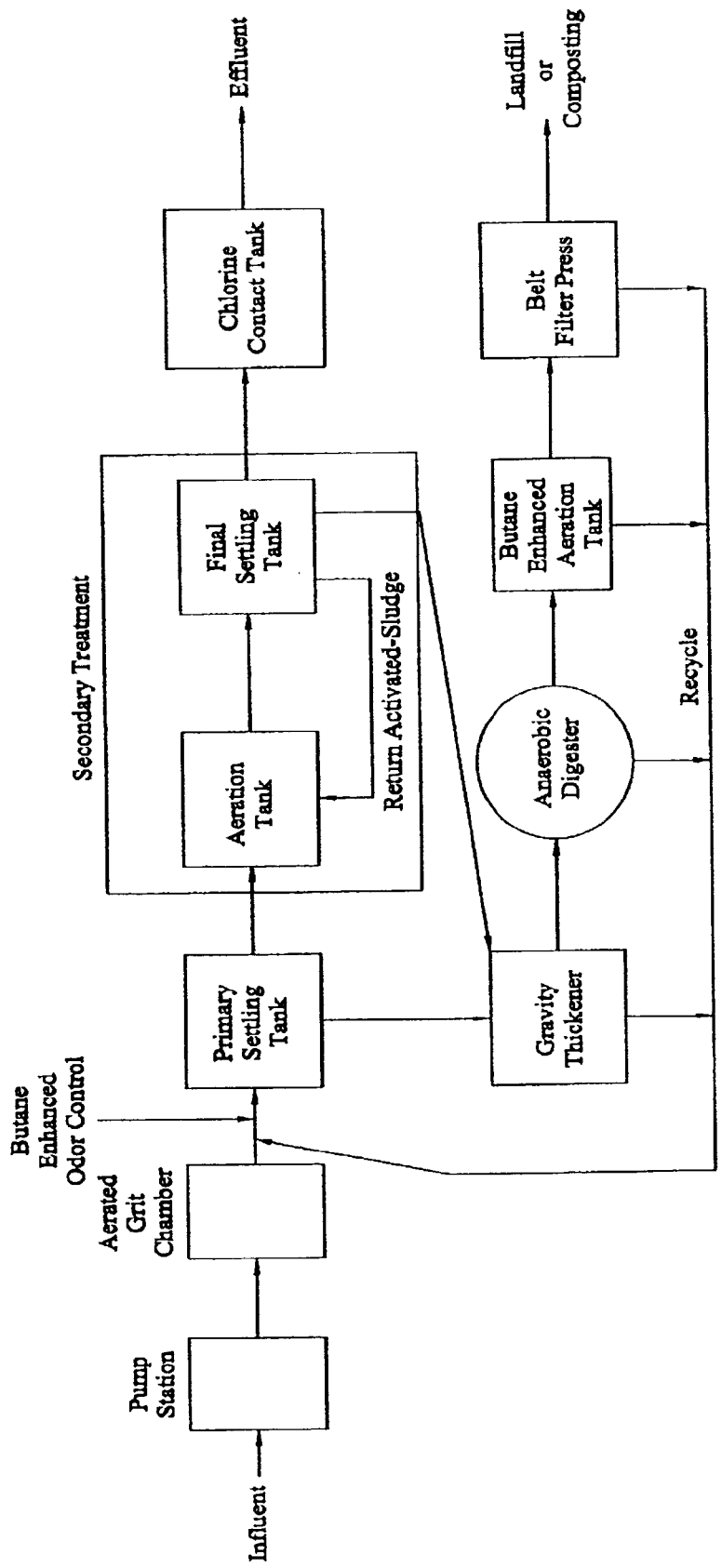
FIG. 9 is a schematic diagram illustrating a butane-enhanced wastewater treatment process in accordance with another embodiment of the present invention.

FIG. 9 is a schematic diagram illustrating a butane-enhanced wastewater treatment process in accordance with another embodiment of the present invention. In the embodiment shown in FIG. 9, wastewater undergoes butane-enhanced odor control before it is fed to a primary settling tank. A secondary treatment stage similar to that shown in FIG. 8b is used, except the final settling tank is connected to a gravity thickener. Wastewater exiting the gravity thickener is fed to an anaerobic digestor, followed by a butane-enhanced aeration tank. After treatment in the butane-enhanced aeration tank, the wastewater is fed to a belt filter press. Some of the material from the gravity thickener, anaerobic digestor, butane-enhanced aeration tank and belt filter press may be recycled to the primary settling tank.

The butane injection processes may be used to treat BOD, TOC, ammonia, nitrates, nitrites, phosphorus, total organic carbon, organic and mineral settleable and nonsettleable suspended solids, organic and mineral colloidal and dissolved filterable solids and sludge. For example, the butane/air process will treat sludge and solids contaminated with nitrogen-based aromatics (explosives), PCBs, pesticides, chlorinated aliphatic and aromatic compounds, aliphatic and aromatic hydrocarbons, and PAHs, esters, ethers, aldehydes, amines, dioxin-and related compounds, herbicides, ketones, phenols, sulfur-containing organics and alcohols, ethylene dibromide (EDB), chlorophenolic compounds (chlorophenols, chloroguiacols, and chlorocatechols, pulp mill effluent, low-level radioactive wastes, chlorate (pulp bleaching), cyanide, arsenic, chromium, copper, iron, lead, and other metals.

Some of the pollutants which may be degraded by the present system and method include chlorinated aliphatics, chlorinated aromatics and non-chlorinated aromatics and aliphatics, with chlorinated aliphatic hydrocarbons being of particular interest. Specific hydrocarbon pollutants include trichloroethene (TCE), trichloroethane (TCA) (e.g., 1,1,2-trichloroethane and 1,1,1-trichloroethane), methylene chloride, 1,1-dichloroethane, chloroform, 1,2-dichloropropane, dibromochloromethane, 2-chloroethylvinyl ether, tetrachloroethene (PCE), chlorobenzene, 1,2-dichloroethane, bromodichloromethane, trans-1,3-dichloropropene, cis-1,3-dichloropropene, bromoform, chloromethane, bromomethane, vinyl chloride, chloroethane, 1,1-dichloroethene, trans-1,2-dichloroethene, methyl tertiary butyl ether (MTBE), polychlorinated biphenyl (PCB), dichlorobenzenes, cis-1,2-dichloroethene, dibromomethane, 1,4-dichlorobutane, 1,2,3-trichloropropane, bromochloromethane, 2,2-dichloropropane, 1,2-dibromoethane, 1,3-dichloropropane, bromobenzene, chlorotoluenes, trichlorobenzenes, trimethylbenzenes, trans-1,4-dichloro-2-butene and butylbenzenes. Additional pollutants include petroleum compounds such as crude oil, refined oil, Nos. 2, 4 and 6 fuel oils, gasoline, benzene, toluene, ethylbenzene and xylene (BTEX), and creosote.

Facultative anaerobes and microaerophilic bacteria are capable of surviving at low levels of oxygen. They do not require strict anaerobic conditions such as the obligate anaerobes. Acidophilic, alkaliphilic, anaerobe, anoxygenic, autotrophic, chemolithotrophic, chemoorganotroph, chemotroph, halophilic, methanogenic, neutrophilic, phototroph, saprophytic, thermoacidophilic, and thermophilic bacteria may be used.

Wastewater treatment processes that may be used in accordance with the present invention include the use of butane-utilizing microorganisms which may be found naturally in wastewater. Bacteria may include the following Groups (in addition to fungi, algae, protozoa, rotifers and all other microbial populations found in municipal, agricultural and industrial wastewaters.)

Group 1: The Spirochetes
Group 2: Aerobic/Microaerophilic, motile, helical/vibroid, gram-negative bacteria
Group 3: Nonmotile (or rarely motile), gram-negative bacteria
Group 4: Gram-negative aerobic/microaerophilic rods and cocci
Group 5: Facultatively anaerobic gram-negative rods
Group 6: Gram-negative, anaerobic, straight, curved, and helical bacteria
Group 7: Dissimilatory sulfate- or sulfur-reducing bacteria
Group 8: Anaerobic gram-negative cocci
Group 10: Anoxygenic phototrophic bacteria
Group 11: Oxygenic phototrophic bacteria
Group 12: Aerobic chemolithotrophic bacteria and associated organisms
Group 13: Budding and/or appendaged bacteria
Group 14: Sheathed bacteria
Group 15: Nonphotosynthetic, nonfruiting gliding bacteria
Group 16: The fruiting, gliding bacteria and the Myxobacteria
Group 17: Gram-positive cocci Group 18: Endospore-forming gram-positive rods and cocci
Group 19: Regular, nonsporing, gram-positive rods
Group 20: Irregular, nonsporing, gram-positive rods
Group 21: The mycobacteria
Groups 22–29: The actinomycetes
Group 22: Nocardioform actinomycetes
Group 23: Genera with multiocular sporangia
Group 24: Actinoplanetes
Group 25: Streptomycetes and related genera
Group 26: Maduromycetes
Group 27: Thermomonospora and related genera
Group 28: Thermoactinomycetes
Group 29: Genus Glycomyces, Genus Kitasatospira and Genus Saccharothrix
Group 30: The Mycoplasmas—cell wall-less bacteria
Group 31: The Methanogens
Group 32: Archaeal sulfate reducers
Group 33: Extremely halophilic, archaeobacteria (halobacteria)
Group 34: Cell wall-less archaeobacteria
Group 35: Extremely thermophilic and hyperthermophilic $S^0$-metabolizers Degradation of complex organic pollutants in the butane digester preferably requires the interaction of microbial populations (consortia). Butane or alkane-utilizing bacteria may degrade pollutants aerobically (or anaerobically) through direct metabolism, sequential metabolism, reductive metabolism, dehalogenation, or cometabolism.

The requirement for a controlled environment and biological community may dictate the design of treatment facilities and the kinetics of biological growth. Typically, during conventional wastewater treatment, bacterial growth can be expressed as the variation of the mass of the microorganisms with time. Four phases have been used to describe bacterial growth: the lag phase; the log-growth phase; the declining growth phase; and the endogneous phase.

The lag phase represents the time required for bacteria to acclimate to their nutritional environment. Butane availability may shorten the lag phase by acclimating (and stabilizing) the microbial populations in their environment. For example, by stabilizing the microbial populations during pulsed cycles of butane and air (or oxygen), the entire microbial community may be better adapted for purification processes.

In the log-growth phase, there is excess food surrounding the organisms, and the rate of metabolism and growth is a function of the ability of the bacterial populations to process the substrate. Because of its solubility, pulsed cycles of butane may adapt the microbial populations to better utilize the excess of available carbon substrates (of varying availabilities) in the wastewater by acclimating (and stabilizing) the microbial populations in the apparently nutrient-rich environment. This in turn will increase the microbial communities to process an increased number of available substrates. Butane may be pulsed to create feeding frenzy/starvation cycles. During the starvation cycle, the increased microbial populations (a larger percentage of the population containing butane-utilizing bacteria) will be forced to consume and mineralize the remaining wastewater constituents, such as organic substrates possessing varying microbial availabilities at biological rates that would exceed conventional treatment processes.

In the declining growth phase, the rate of increase of bacterial mass decreases because of limitations in the food supply. Butane availability will reverse the effects of limitations in the food supply thereby increasing the rate of bacterial mass. During conventional wastewater treatment, the established microbial populations consume the most readily available carbon sources. As the readily available sources diminish, the more recalcitrant carbon sources remain in the wastewater mix. This in turn causes a decrease in the bacterial mass. Butane pulsing offsets the effects of carbon source availability by reinforcing and strengthening the adapted microbial populations. The adapted populations attack the remaining carbon sources during the starvation cycles with renewed vigor.

In the endogenous phase, microorganisms are forced to metabolize their own protoplasm without replacement because the concentration of available food is at a minimum. Butane availability will reverse the effects of the endogenous phase. With butane pulses, the endogenous phase period will be drastically reduced and may occur (if at all) during the starvation cycles (of short duration).

The following examples are intended to illustrate various aspects of the present invention and are not intended to limit the disclosure or claims of the invention.

EXAMPLE 1

Figure 10:
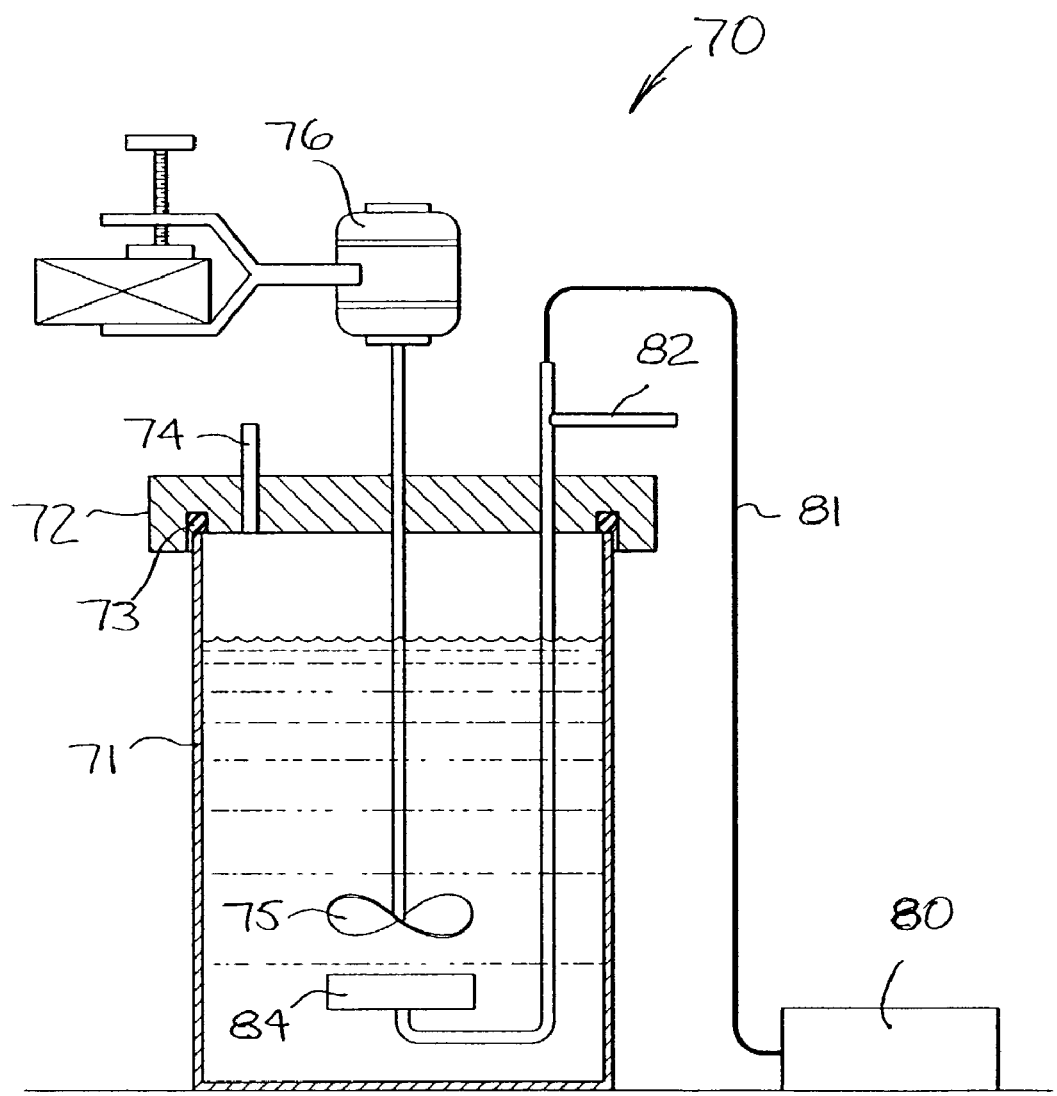
FIG. 10 is a partially schematic side view of a bioreactor used to treat municipal wastewater sludge with butane in accordance with an embodiment of the present invention.

Return activated-sludge (RAS) was collected from a municipal wastewater treatment plant located in Massachusetts. The RAS was drawn from the return line of a settling tank (after treatment in an aeration tank) in an activated-sludge process municipal wastewater treatment plant. RAS consists of the mixture of old and new aerobic bacterial cells, which have settled out in the settling tank over a period of time. The activated-sludge was introduced into a bioreactor vessel comprising aeration diffusers, a constant speed electric mixer with propeller, an air-supply pump, and vent line, as illustrated in FIG. 10. The bioreactor 70 shown in FIG. 10 includes a containment vessel 71 with a screw down cover 72 sealed with a gasket 73. A vent line 74 extends through the cover 72. An impeller 75 mounted in the vessel 71 is rotated by a motor assembly 76. An air supply pump 80 is connected to an air feed line 81. A butane injection port 82 is connected to the air feed line 81. A diffuser 84 is connected at the end of the air feed line 81.

The reactor contained approximately five gallons of organic waste, which consisted of water with the addition of the return activated-sludge from the treatment plant. The return activated-sludge appeared to have the consistency of slurry prior to the addition of water. Prior to the butane injections, the solids were thoroughly mixed and a composite sample was drawn for analysis of total solids. The results are summarized in Table 1 below. The constant speed mixer and aeration system were operated continually (200 liters per hour) with brief stops every hour to conduct butane injections (500 ml of n-butane). The butane was injected into a syringe port connected to the air-supply line at hourly intervals as shown on Table 1 and in FIG. 10. After a period of approximately three days, the butane injections were halted. During the hours not shown in the table, the bioreactor was operated with aeration and mixing without butane injection.

On Day No. 1, a pretreatment composite sample was collected from the bioreactor after thorough mixing of the RAS with the propeller unit (2 minutes). The sample was submitted to Rhode Island Analytical Laboratory for total solids analysis referencing EPA Method 160.3. The results are summarized in Table 2 below.

On Day No. 5, a composite sample was collected from the bioreactor (post butane treatment) and submitted to Rhode Island Analytical Laboratory for total solids analysis referencing EPA Methods 160.3. The results are summarized in Table 1 below.

TABLE 1

| Day No. | Time | Volume of Butane | Aeration (200 L/hr) | Mixing |
|---|---|---|---|---|
| 1 | 19:00 | 500 ml | On | On |
| 1 | 20:00 | 500 ml | On | On |
| 1 | 21:00 | 500 ml | On | On |
| 2 | 08:00 | 500 ml | On | On |
| 2 | 09:00 | 500 ml | On | On |
| 2 | 11:00 | 500 ml | On | On |
| 2 | 12:00 | 500 ml | On | On |
| 2 | 13:00 | 500 ml | On | On |
| 2 | 14:00 | 500 ml | On | On |
| 2 | 15:00 | 500 ml | On | On |
| 2 | 16:00 | 500 ml | On | On |
| 2 | 17:00 | 500 ml | On | On |
| 2 | 18:00 | 500 ml | On | On |
| 2 | 19:00 | 500 ml | On | On |
| 2 | 20:00 | 500 ml | On | On |
| 3 | 10:00 | 500 ml | On | On |
| 3 | 11:00 | 500 ml | On | On |
| 3 | 12:00 | 500 ml | On | On |
| 3 | 13:00 | 500 ml | On | On |
| 3 | 14:00 | 500 ml | On | On |
| 3 | 15:00 | 500 ml | On | On |
| 3 | 16:00 | 500 ml | On | On |
| 3 | 17:00 | 500 ml | On | On |
| 3 | 18:00 | 500 ml | On | On |

TABLE 2

| Day No. | Total Solids (mg/l) | Settleable Solids (ml/l) |
|---|---|---|
| 1 (Pretreatment) | 2,200 | 329 |
| 5 (Butane Treatment) | 1,900 (14% reduction) | 158 (52% reduction) |

The RAS slurry immediately thinned (within 10 hours) after the butane injections. The RAS appeared less dense with a flocculant consistency. In addition, all odors associated with the RAS sludge sample were not detectable by olfactory senses after the first three butane injections conducted on Day No. 1. Thus, butane may be used for odor control in wastewater and other industries.

On Day No. 3, the sludge was observed to rise in the bioreactor chamber and into the vent tubing. In addition, small diameter bubbles were observed at the liquid surface. We believe the bubbles were nitrogen gas generated during denitrification processes. As the nitrogen gas formed in the RAS, the sludge mass became buoyant and rose in the bioreactor chamber (rising sludge phenomenon). Since denitrification was believed to be an anaerobic process, this phenomenon was unexpected since the aeration process was operated continually during the process treatment. Although not intending to be bound by any particular theory, the principal biochemcial pathways of denitrification may not be anaerobic but rather a modification of aerobic pathways. Alternatively, the butane injections may have increased oxygen demand to the point that exceeded the capacity of the aeration unit used for the study. Consequently, the bioreactor may have turned slightly anoxic. The bioreactor example described above only details the process and method conception. Optimization of the process (i.e., butane volume and flow rates) was not detailed or considered.

EXAMPLE 2

A butane-injection system was installed in a municipal wastewater treatment plant comprising an extended aeration activated sludge system. The plant included an aerated 12,000 gallon sludge thickening and holding tank. The sludge tank was equipped with an air/butane injector and diffuser. The injector constantly fed air to the tank at a rate of about 5 cubic feet per minute. Twice per day butane was added to the injected air stream for 6 minutes. During an initial 8-day period, a total amount of approximately 120 pounds of butane was pulsed to the tank. After the initial 8-day period, settleable solids of the sludge were measured by placing a sample of the treated sludge in a one liter container and observing the upper level of the settleable solids versus the upper level of the liquid after 120 minutes. The initial 8-day sample had a 50 ml/l drop after 120 minutes. A subsequent 8-day test was then conducted. All but 2,000 gallons of the initial butane treated sludge was removed from the tank, and the tank was refilled with fresh sludge. Air and butane were injected into the sludge tank in the same manner as the initial 8-day test. After the second 8-day treatment period, settleable solids were measured as a 75 ml/l drop after 120 minutes. The greater drop after the second 8-day test indicates improved settleable solids reduction. Optimization of the butane injection process would further optimize the solids reduction. In addition to solids reduction resulting from the butane treatment, upon initiation of the butane injection, odor of the sludge tank was substantially reduced.

In accordance with an embodiment of the present invention, butane enhanced treatment of wastewater may be conducted as a modification of existing aeration tanks in municipal or chemical wastewater treatment facilities or as stand alone or ancillary treatment reactors. Many variations or process permutations exist or may be implemented using the alkane process. The process could be modified to pretreat sludge, treat sludge on-line, treat return sludge, lower biological oxygen demand, total organic carbon or any other form of wastewater where solids reduction, odor control or organics removal is desirable. The alkane process may also be used to further treat sludge obtained from anaerobic digestion processes. The process may be used to reduce solids in any type of wastewater effluent. Furthermore, butane may be injected into wastewater early in the treatment process to abate nuisance odors associated with wastewater liquids/solids.

Whereas particular embodiments of this invention have been described above for purposes of illustration, it will be evident to those skilled in the art that numerous variations of the details of the present invention may be made without departing from the invention as defined in the appended claims.

What is claimed is:

1. A method of treating material contained in municipal sewage system wastewater, the method comprising:
    stimulating growth of aerobic butane-utilizing bacteria; and
    allowing the butane-utilizing bacteria to degrade at least a portion of the municipal sewage system wastewater material.

2. The method of claim 1, wherein the butane-utilizing bacteria are grown in the municipal sewage system wastewater.

3. The method of claim 1, wherein the butane-utilizing bacteria are grown by introducing a butane substrate into the municipal sewage system wastewater.

4. The method of claim 3, wherein the butane substrate comprises at least about 10 weight percent butane.

5. The method of claim 3, wherein the butane substrate comprises at least about 50 weight percent butane.

6. The method of claim 3, wherein the butane substrate comprises at least about 90 weight percent butane.

7. The method of claim 3, wherein the butane substrate comprises at least about 99 weight percent butane.

8. The method of claim 1, further comprising introducing oxygen-containing gas into the municipal sewage system wastewater.

9. The method of claim 8, wherein the oxygen-containing gas is introduced in the form of air.

10. The method of claim 1, wherein the municipal sewage system wastewater is contained in a municipal wastewater treatment plant.

11. The method of claim 1, wherein the butane-utilizing bacteria are present in a primary settling tank.

12. The method of claim 1, wherein the butane-utilizing bacteria are present in an aeration tank.

13. The method of claim 1, wherein the butane-utilizing bacteria are present in a sludge tank.

14. The method of claim 1, further comprising reducing odor of the municipal sewage system wastewater by introducing a butane substrate to the municipal sewage system wastewater.

15. A method of reducing odor of municipal wastewater comprising introducing butane to the municipal wastewater.

* * * * *